May 23, 1972   F. H. SMITH   3,664,745
INTERFEROMETER
Filed April 23, 1970
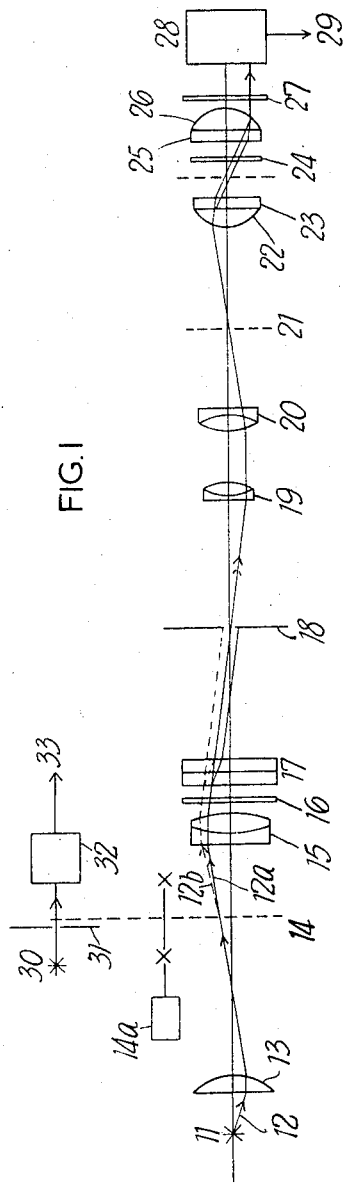
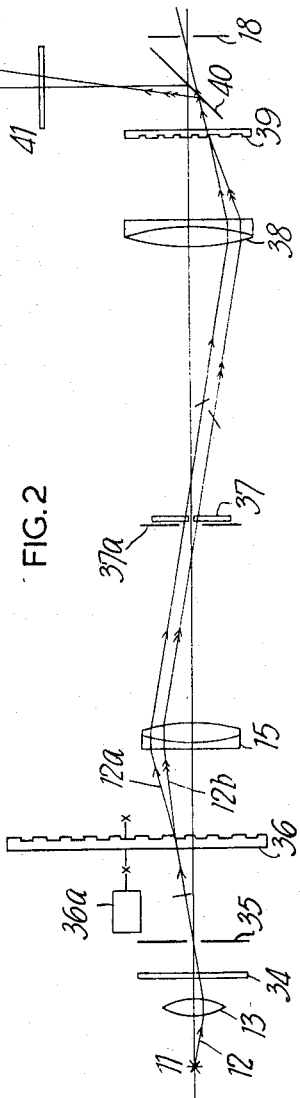
Inventor
Francis Hughes Smith
By
Pennie, Edmonds, Morton, Taylor & Adams
Attorneys United States Patent Office 3,664,745
Patented May 23, 1972

3,664,745
INTERFEROMETER
Francis Hughes Smith, York, England, assignor to
Vickers Limited, London, England
Filed Apr. 23, 1970, Ser. No. 31,246
Claims priority, application Great Britain, Apr. 23, 1969,
20,848/69
Int. Cl. G01b 9/02; G02b 21/06
U.S. Cl. 356—113
32 Claims

ABSTRACT OF THE DISCLOSURE

In an interferometer having a first beam-splitter for dividing an incident beam of light into a plurality of beams of coherent light and a second beam-splitter for recombining two of the said beams into a single composite beam, one of the beam-splitters comprises a radial diffraction grating arranged for continuous rotation.

---

This invention relates to interferometers.

In order to determine the integrated optical thickness, i.e. the physical thickness multiplied by the refractive index, of a refractively heterogeneous specimen, it is necessary to scan the specimen point by point and to sum the resulting sequence of instantaneous optical path differences which differences may be conveniently measured by means of a photoelectric interferometer. It is obviously desirable to perform this scanning operation as rapidly as possible, particularly when the specimen is liable to change, i.e. a living cell. The specification of applicant's Pat. No. 3,520,615 discloses optical phase measuring apparatus in conjunction with an interferometer and, in use of this apparatus, a sampling phase measurement is made for each repetition cycle of a motorised birefringent compensator. It follows that an increased rate of specimen scanning demands a corresponding increase of this sampling frequency if full lateral resolution of the scanning system is not to be significantly degraded.

In the above patent specification, one form of driven compensator employs a rotating birefringent half-wave retardation plate as the active element. The number of repetition cycles per single revolution then depends directly on how many times it is practicable to transmit the polarised beam through the rotating half-wave plate, four cycles resulting from each transmission. In practice, it is difficult to achieve more than two such transmissions without excessive loss of light which means that one achieves only eight cycles per revolution. Again, the rate at which the half-wave plate can be rotated is limited by mechanical considerations to about 200 per second, resulting in 1,600 repetition cycles per second which frequency may in certain cases, e.g. the scanning of living specimens, be too low.

Much higher frequencies can be achieved by employing a rotating grating as the active element, since the resulting frequency is then the product of the speed of rotation and the number of grating elements, or in the case of a half-wave phase grating, twice that value. The above patent specification does, in fact, describe a system using a rotating grating but in that particular system, the light source must provide a continuous spectrum. This is because the system depends upon the formation of fringes of equal chromatic order.

An object of the present invention is to offer the advantage of the high-frequencies available with rotating grating systems without restricting the kind of light source employed.

According to the present invention, there is provided an interferometer having a first beam-splitter for dividing an incident beam of light into a plurality of beams of coherent light and a second beam-splitter for recombining two of the component beams into a single composite beam, wherein one of the said beam splitters comprises a radial diffraction grating arranged for continuous rotation.

The beams diffracted by the radial grating suffer a cyclical and linear change of phase difference as a result of the continuous rotation of the grating and this cyclical change in phase difference between the recombined components in the composite beam leads to a convenient method of measuring this phase difference by photo-electrically transforming the resulting cyclically varying light intensity into a corresponding cyclically varying electrical voltage and by measuring the phase difference between this voltage and a reference voltage (the frequencies of the two voltages being integrally related to one another) as is set out in the above specification. This, of course, is required in an interferometer where the phase change caused by a specimen placed in the path of one of the component beams has to be measured. The integral relation may of course be 1:1, in which case the frequencies would be equal.

The beam combining device may consist of a double refracting element arranged to double refract both component beams and to bring one of the double refracted continuations of one beam into coincidence with the other double-refracted continuation of the other beam in which case the first beam splitter is the radial diffraction grating. In this arrangement the light incident upon the double refracting element must be polarised light. The first beam splitter may, if desired, consist of a double refracting element for double refracting the incident beam into two beams and the second beam splitter consist of the radial diffraction grating which is arranged to diffract the continuations of the beams into coincident paths. The light incident upon the double refracting element must be polarised.

Alternatively, the recombining beam splitter may consist of a second diffraction grating. In a preferred such arrangement the two beams are differently polarised, which enables the invention to be used for measuring optical phase differences between the plane polarised components associated with a birefringent specimen or with an instrumentally associated double-refracting interferometer. Preferably the modes of polarisation are plane and in mutually perpendicular directions.

In order that the invention may be more fully understood, two embodiments thereof will now be described, by way of example, with reference to the accompanying drawings in which:

FIG. 1 shows schematically the first embodiment, and
FIG. 2 shows a similar view of the second embodiment.

In FIG. 1, a representative ray 12 in an illuminating beam of light from a source 11 passes through a lamp condenser lens 13, whose stop defines an input aperture of the interferometer, and a radial amplitude grating 14 where it is diffracted into a set of mutually divergent diffracted component beams. In the interests of clarity, the figure only shows the zero order component beam 12a and the plus first order diffracted component beam 12b. A lens 15 is positioned downstream of the grating with the latter disposed at the first focal plane of the lens. The lens 15 serves to bring the component beams into mutual parallelism and the beams are then each double-refracted by a doublet plate 17 (e.g. a Savart plate) after passing through a polariser 16. The double-refracting power of the plate 17 is chosen to bring one of the double-refracted continuations of the beam 12a into coincidence with the other double-refracted continuation of the beam 12b. These combined component beams have mutually perpendicular vibration directions and their phase difference is a linear function of the instantaneous position of the diffraction grating 14 taken in a tangential direction. Consequently, when the grating is rotated, the phase difference between the combined component beams varies cyclically and linearly with respect to the speed of rotation and, in fact, means 14a are provided for achieving such rotation. The combined beams then pass through a field diaphragm 18.

In the arrangement of FIG. 1 it is necessary as has been described, for the light incident upon the double refracting element to be polarised although it is not necessary to provide the polariser 16 to achieve this. The light source 11 could equally well be a laser light source which itself emits polarised light.

It will be appreciated that the apparatus described constitutes an interferometer whose beam-splitters are the grating and the double-refracting plate. The virtue of using a grating as the beam splitter is that the required cyclic variation of optical phase difference can be achieved merely by rotating the grating. It is a matter of indifference in which order the grating and the double-refracting plate are disposed.

The combined component beams proceed through a double-refracting interferometer microscope system indicated by a long conjugate plane 21, an objective lens 22, double-refracting plates 23 and 25, an intervening half-wave plate 24 and a condenser lens 26. Following the condenser lens 26 is an analyser 27, having a stop which defines an output aperture of the interferometer, and a photo-detector 28 to transform the varying light intensity resulting from the cyclically varying phase relationship between the component beams into a corresponding cyclically varying voltage.

In the actual arrangement shown, a refracting scanning system is located between two lenses 19 and 20 so that the collimated beam from the lens 19 is deflected into a raster pattern which is imaged by the objective 22 upon a transparent specimen supported at the focus of the objective 22, so as to permit photo-electric integration of localised optical thickness variations of the specimen.

The vibration directions of the orthogonally polarised components generated by the doublet 17 should be substantially orthogonal to the extinction directions of the plates 23 and 25. This ensures that relative optical phase displacements introduced by the transparent specimen, which is supported in the path of one only of the orthogonally polarized components, cause equal and corresponding displacements of the sinusodial light modulation reaching the photo-detector 28. The resulting phase-displaced A.C. signal 29 from the photo-detector is then converted into a proportional output signal which proceeds to an electronic phase-measuring circuit (not shown). It will be appreciated that the specimen is supported in the usual manner by the normal mounting means which, for the sake of clarity, are not shown in detail in FIG. 1 but are represented diagrammatically by a broken line between the plates 23 and 24.

A modulated reference voltage is required with which the phase of the signal 29 may be electronically compared and this is provided by an arrangement as follows. Light from an auxiliary lamp 30 illuminates a light transmitting slit 31 and is converted into a photo-electric voltage 33 by an auxiliary photo-detector 32. The slit 31 is substantially parallel to the transparent slots of the rotating grating 14 so that the latter modulates the light received by the photo-detector 32 at the same frequency as that generated in the main system already described. 33 therefore is a second, reference voltage, which also proceeds to the appropriate portion of the electronic phase-measuring circuit.

Alternatively the reference signal may be obtained by the means to be described with reference to FIG. 2.

Reverting to the interferometer 11 to 18, it is particularly important to note the apparatus will function just as well if the grating is a wholly transparent phase grating. Indeed, this has the advantage of enhanced light transmission, especially if the phase grating is a half-wave length grating, i.e. a grating wherein one set of alternate elements retards the light by substantially half a wave length relative to the other alternate set. Under these circumstances the grating produces virtually no zero order beam provided that the elements are all of equal width. This results in most of the light being concentrated into the plus first and minus first orders. An arrangement using such a grating is illustrated in FIG. 2 to which reference is now made.

As in FIG. 1, 12 is a representative ray in an illuminating beam of light from a source 11 which passes through a lamp condenser lens 13. The latter images the small light source onto a slit 35 through a polariser 34. A rotatable half-wave length phase grating 36 diffracts the ray 12 into a set of mutually divergent diffracted orders of which the plus first and the minus first orders are indicated by 12a and 12b, means 36a being provided for rotating the grating. As in FIG. 1, these component beams are brought into mutual parallelism by a lens 15 and the two orders are orthogonally plane polarised by a pair of laterally juxtaposed plane polarising plates 37 whose vibration directions are mutually crossed and which are substantially diagonal to the vibration direction of the polariser 34. Thus, the two diffracted orders emerge from the polarising plates 37 with their vibration directions mutually perpendicular so that they can subsequently be utilised as the two beams of a double-refracting interferometer or as the two component beams associated with a subsequent birefringent specimen. Although in the arrangement shown the light received by the plates 37 must be polarised, it is not necessary to provide the polariser 34 to achieve this. The light source 11 may equally well be a laser source emitting polarised light.

A further lens 38 serves to image the rotating phase grating 36 upon a stationary phase grating 39 whereat the beams are combined by being differently diffracted along coincidental paths, these paths corresponding to the plus first and minus first orders generated by the grating 39. For precise recombination to occur, the image of the grating 36 must have the same pitch (grating element spacing) and shape as the grating 39. It is immaterial which of the two gratings is rotated.

The polarising plates 37 are preceded by a slot-form diaphragm 37a to eliminate spurious modulations from diffracted orders higher than unity. Although this diaphragm is, in the arrangement shown, placed immediately before the plates 37, it may in fact be placed in any position where the diffracted orders of the grating 36 are spatially separated.

If it is desired to use the interferometer in conjunction with a main double refracting interferometer microscope then the diaphragm 18 in FIG. 2 will be followed by the components 19 to 28 of FIG. 1. The aforesaid reference signal may be obtained as shown in FIG. 1 but it is preferable with the interferometer of FIG. 2 to obtain this signal directly from the intefering component beams by means of a beam-splitter 40 disposed in the path of the combined beams from the second grating, an analyser 41 and a photodetector 42. In this case either of the two beams from the beam-splitter 40 may be used as the main channel with the other beam employed as the reference channel.

A salient feature of the double-grating system of FIG. 2 is that it can operate over the entire spectral range of wave lengths simultaneously as compared with the arrangement of FIG. 1 where the ray displacement due to the doublet 17 can correspond with the corresponding displacement associated with the rotating diffraction grating for only one narrow spectral region. As regards the type of grating used, in either arrangement an amplitude or a phase grating may be employed.

I claim:

1. An interferometer, comprising input aperture means for admitting light from a light source; output aperture means spaced from said input aperture means; optical elements arranged for passing light from said input aperture means to said output aperture means; a radial diffraction grating mounted rotatably between said input and output aperture means for intercepting said light and co-operating with said optical elements to produce, from said light, first and second mutually coherent component light beams directed respectively along first and second paths in the interferometer; specimen mounting means for positioning a specimen in said first path to vary the optical length thereof relative to that of said second path; an optical beam-combining device mounted adjacent to said output aperture means for receiving said first and second output component beams and recombining them to form a single output light beam; rotary drive means conected with said radial diffraction grating for continuously rotating said grating to cause said output beam to vary sinusoidally in intensity with a phasing dependent upon said relative optical length of said first path; first photoelectroc means to receive said output beam via said output aperture means, for producing a first voltage varying cyclically as said intensity of said output beam; and second photoelectric means arranged to co-operate with the grating during rotation thereof to provide a second voltage which varies cyclically with a frequency which is integrally related to the frequency of variation of said first voltage for phase-comparison with said first voltage to provide a measure of phase changes between the cyclically varying first and second voltages due to variations in said relative optical length of said first path.

2. An interferometer according to claim 1, in which said radial diffraction grating itself divides by diffraction said light into two mutually coherent component light beams.

3. An interferometer according to claim 1, wherein said second photoelectric means are disposed on one side of the grating and the interferometer further comprises an auxiliary lamp disposed on the other side of the grating so that light from the lamp received by the second photoelectric means is modulated by the grating during rotation thereof.

4. An interferometer according to claim 1, wherein said optical elements include a first beam-splitter for dividing said light into two mutually coherent component light beam and said radial diffraction grating is mounted to receive said two component light beams and diffract a continuation of one of said two beams into coincidence with a continuation of the other of said two beams to provide an intermediate composite light beam, and wherein said optical elements further include a second beam-splitter mounted to receive said intermediate composite light beam and split it into said first and second mutually coherent component light beams.

5. An interferometer according to claim 4, further comprising a beam-divider mounted in the path of said intermediate composite beam to divide said intermediate composite beam into two beams, said second photoelectric means being mounted to receive one of said two beams and the other beam from said beam-divider being passed to said second beam-splitter to produce said first and second component light beams.

6. An interferometer according to claim 5, wherein said light is polarized and said first beam-splitter comprises a double refracting element for double refracting said light into said two component light beams, there being an analyser disposed optically between said beam-divider and said second photoelectric means.

7. An interferometer according to claim 4, wherein said first beam-splitter comprises a double refracting element for double refracting said light into said two component light beams, means being provided to polarize said light.

8. An interferometer according to claim 5, in which said double refracting element comprises a birefringent plate doublet.

9. An interferometer according to claim 4, wherein said second beam-splitter comprises a double refracting element for double refracting said light into said two component light beams, the interferometer including a polarizing light source to provide said light.

10. An interferometer according to claim 9, in which said double refracting element comprises a birefringent plate doublet.

11. An interferometer according to claim 1, wherein said radial diffraction grating itself divides by diffraction said light into two mutually coherent component light beams, and said optical elements include a beam-combiner which recombines said two mutually coherent component light beams into a intermediate composite light beam, and a beam-splitter mounted to receive said intermediate composite light beam and split it into said first and second mutually coherent component light beams.

12. An interferometer according to claim 11, including a slot-form diaphragm located at a position where the diffraction orders of the first grating are spatially separated to eliminate spurious modulations from such diffracted orders which are higher than unity.

13. An interferometer according to claim 11, further comprising a beam-divider disposed in the path of said intermediate composite beam to divide said intermediate composite beam into two beams, said second photoelectric means being mounted to receive one of said two beams and the other beam from said beam-divider being passed to said beam-splitter to produce said first and second component light beams.

14. An interferometer according to claim 13, wherein the light incident upon the beam combiner is polarized and the beam-combiner comprises a double refracting element arranged to double refract both said two component light beams and to bring one of the double-refracted continuations of one of said two component light beams into coincidence with the other double-refracted continuation of the other of said two component light beams to produce said intermediate composite beam, there being an analyser disposed optically between said beam-divider and said second photoelectric means.

15. An interferometer according to claim 11, wherein said beam-combiner comprises a double refracting element arranged to double refract both said two component light beams and to bring one of the double-refracted continuations of one of said two beams into coincidence with the other double-refracted continuation of the other of said two beams to produce said intermediate composite beam, means being provided to polarize the light incident upon said double refracting element.

16. An interferometer according to claim 12, wherein said double refracting element comprises a birefringent plate doublet.

17. An interferometer according to claim 11, wherein said beam-combiner comprises a double refracting element arranged to double refract both said two component light beams and to bring one of the double-refracted continuations of one of said two beams into coincidence with the other double-refracted continuation of the other of said two beams to produce said intermediate composite beam, the interferometer including a polarizing light source to provide said light.

18. An interferometer according to claim 17, wherein said double refracting element comprises a birefringent plate doublet.

19. An interferometer according to claim 11, wherein said beam-combiner comprises a second, fixed radial diffraction grating mounted to receive said two component beams and diffract the continuations of said two component beams into coincident paths to form said intermediate composite beam.

20. An interferometer according to claim 19, further comprising polarizing means disposed optically prior to said fixed grating for imparting different respective manners of polarization to said two component beams.

21. An interferometer according to claim 20, in which said polarizing means plane polarize said two component beams in mutually perpendicular directions.

22. An interferometer according to claim 21, wherein said polarizing means comprise a pair of laterally juxtaposed plane polarizing plates disposed optically between the first grating and said fixed grating, and a polarizing element disposed optically prior to said polarizing plates, the vibration directions of the plates being mutually crossed and substantially diagonal to the vibration direction of the polarizing element.

23. An interferometer according to claim 20, wherein the polarizing means comprise a pair of laterally juxtaposed plane polarizing plates and wherein a polarizing light source is employed to provide said light.

24. An interferometer according to claim 23, in which the vibration directions of the polarizing plates are mutually crossed and substantially diagonal to the vibration direction of said light from said polarizing light source.

25. An interferometer according to claim 4, wherein said first beam-splitter comprises a second, fixed radial diffraction grating for dividing said light by diffraction into said two mutually coherent component light beams.

26. An interferometer according to claim 25, including a slot-form diaphragm located at a position where the diffraction orders of the fixed grating are spatially separated to eliminate spurious modulations from such diffracted orders which are higher than unity.

27. An interferometer according to claim 25, further comprising polarizing means disposed optically prior to the rotatable grating for imparting different respective manners of polarization to said two component beams.

28. An interferometer according to claim 27, in which said polarizing means plane polarize said two component beams in mutually perpendicular directions.

29. An interferometer according to claim 28, wherein said polarizing means comprise a pair of laterally juxtaposed plane polarizing plates disposed optically between said fixed grating and said rotatable grating, and a polarizing element disposed optically prior to said polarizing plates, the vibration direction of the plates being mutually crossed and substantially diagonal to the vibration direction of the polarizing element.

30. An interferometer according to claim 27, wherein the polarizing means comprise a pair of laterally juxtaposed plane polarizing plates and wherein a polarizing light source is employed to provide said light.

31. An interferometer according to claim 30, in which the vibration directions of the polarizing plates are mutually crossed and substantially diagonal to the vibration direction of said light from said polarizing light source.

32. An interferometer according to claim 27, further comprising a beam-divider mounted in the path of said intermediate composite light beam to divide said intermediate composite beam into two beams, said second photoelectric means being mounted to receive one of said two beams and the other beam from said beam divider being passed to said second beam-splitter to produce said first and second component light beams, and also comprising an analyser disposed optically between said beam divider and said second photoelectric means.

References Cited
UNITED STATES PATENTS 3,419,330   12/1968   Schneider _____ 350—106

RONALD L. WIBERT, Primary Examiner

C. CLARK, Assistant Examiner

U.S. Cl. X.R.
350—12

PO-1050
(5/69)

UNITED STATES PATENT OFFICE
CERTIFICATE OF CORRECTION

Patent No. 3,664,745          Dated May 23, 1972

Inventor(s) Francis Hughes Smith

It is certified that error appears in the above-identified patent and that said Letters Patent are hereby corrected as shown below:

Column 5, line 15 (Claim 1, line 17), change "conected" to --connected--.

Column 5, line 19 (Claim 1, line 21), change "photoelectroc" to --photoelectric--.

Column 5, line 20 (Claim 1, line 22), before "to" insert --mounted--.

Column 5, line 45 (Claim 4, line 4), change "beam" to --beams--.

Signed and sealed this 28th day of November 1972.

(SEAL)
Attest:

EDWARD M. FLETCHER, JR.          ROBERT GOTTSCHALK
Attesting Officer                   Commissioner of Patents